United States Patent
Kodama et al.

(10) Patent No.: US 7,249,370 B2
(45) Date of Patent: Jul. 24, 2007

(54) COMMUNICATION SYSTEM AND TRANSFER DEVICE

(75) Inventors: Mitsuru Kodama, Nishitokyo (JP); Kenjirou Tsuji, Chofu (JP); Issei Nishimura, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 10/531,708

(22) PCT Filed: Oct. 14, 2003

(86) PCT No.: PCT/JP03/13126

§ 371 (c)(1),
(2), (4) Date: Sep. 27, 2005

(87) PCT Pub. No.: WO2004/036835

PCT Pub. Date: Apr. 29, 2004

(65) Prior Publication Data

US 2006/0143692 A1   Jun. 29, 2006

(30) Foreign Application Priority Data

Oct. 17, 2002 (JP) .............................. 2002-303494

(51) Int. Cl.
*H04L 9/32* (2006.01)
(52) U.S. Cl. .................... 726/3; 709/201; 370/467; 713/168
(58) Field of Classification Search .............. 713/3; 726/3
See application file for complete search history.

(56) References Cited

U.S. PATENT DOCUMENTS

| 5,748,736 | A |  | 5/1998 | Mittra |
| 6,804,254 | B1 | * | 10/2004 | Pearce et al. ............... 370/467 |
| 2002/0083344 | A1 |  | 6/2002 | Vairavan |

FOREIGN PATENT DOCUMENTS

| JP | 11239164 A | * | 8/1999 |
| WO | 02 19651 |  | 3/2002 |

OTHER PUBLICATIONS

Tachikawa, Keiji. W-CDMA Mobile Communications System, pp. 357-360, with English translation 2001.

* cited by examiner

*Primary Examiner*—Taghi T. Arani
(74) *Attorney, Agent, or Firm*—Oblon, Spivak, McClelland, Maier & Neustadt, P.C.

(57) ABSTRACT

A video data providing unit (10) connects to a restricted access providing-side VPN (20). A streaming server (60) connects to a restricted access transmitting-side VPN (50). A router (40) determines whether or not transmitting-side data such as request data or instruction data received via the transmitting-side VPN (50) is data that has been transmitted from the streaming server (60), and whether or not providing-side data such as video data received via the providing-side VPN (20) is data that has been transmitted from the information providing unit (10). The router 40 then transfers the transmitting-side data and providing-side data based on those determination results.

9 Claims, 9 Drawing Sheets

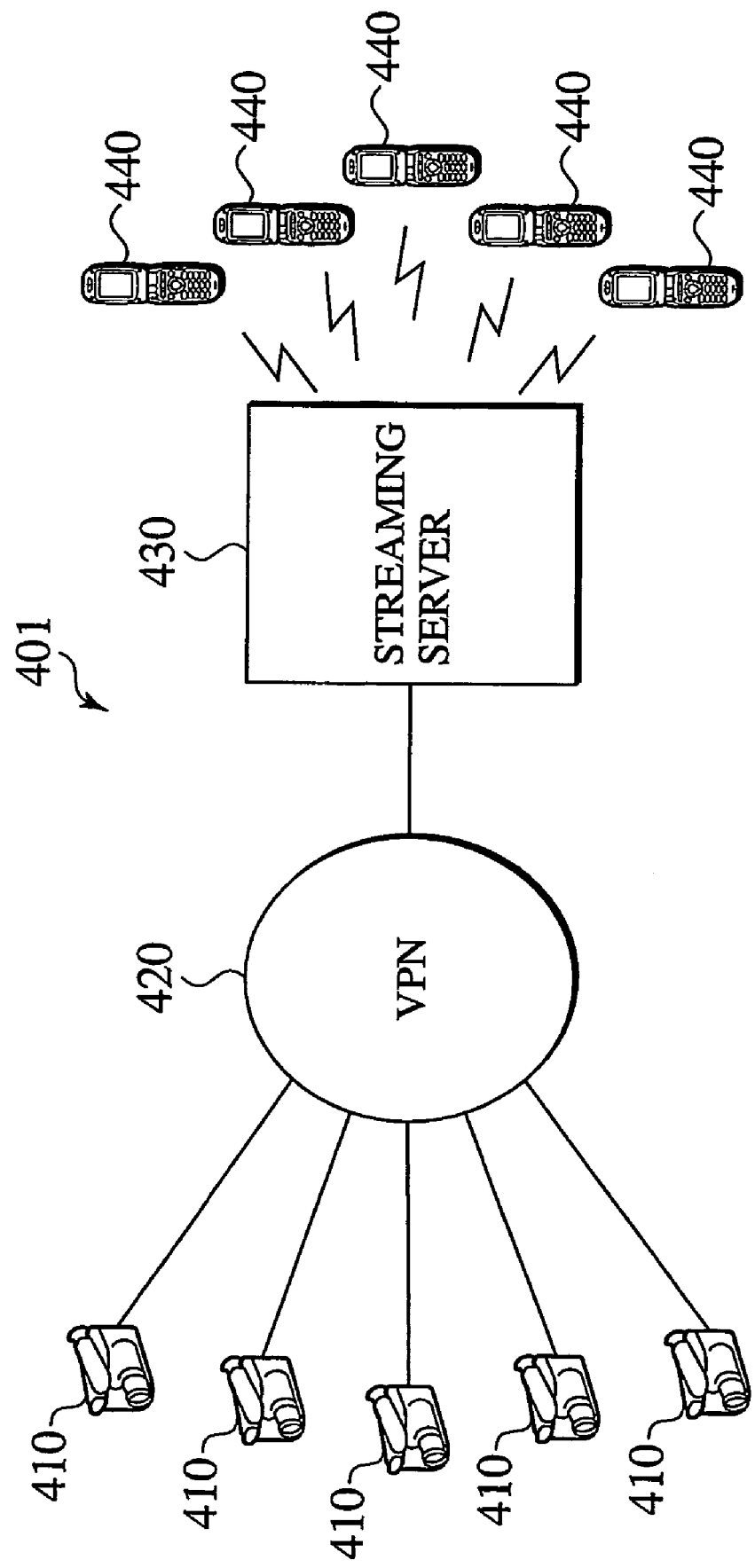

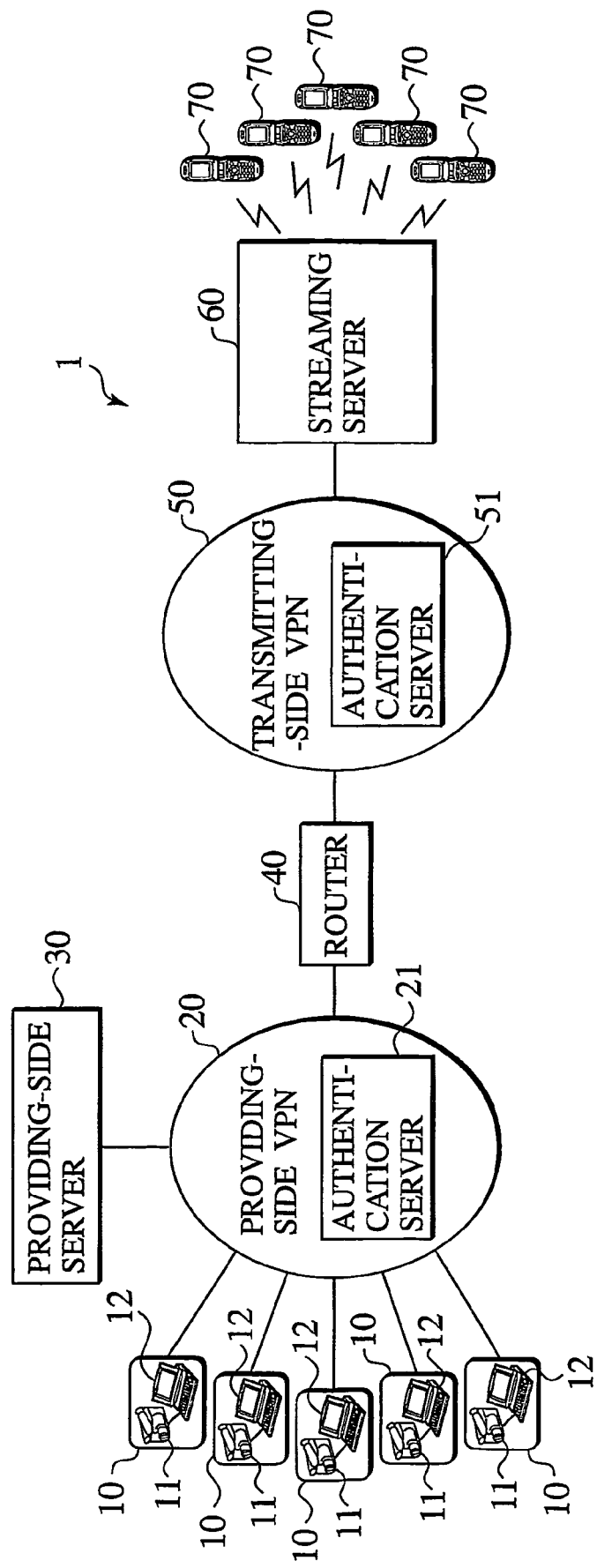

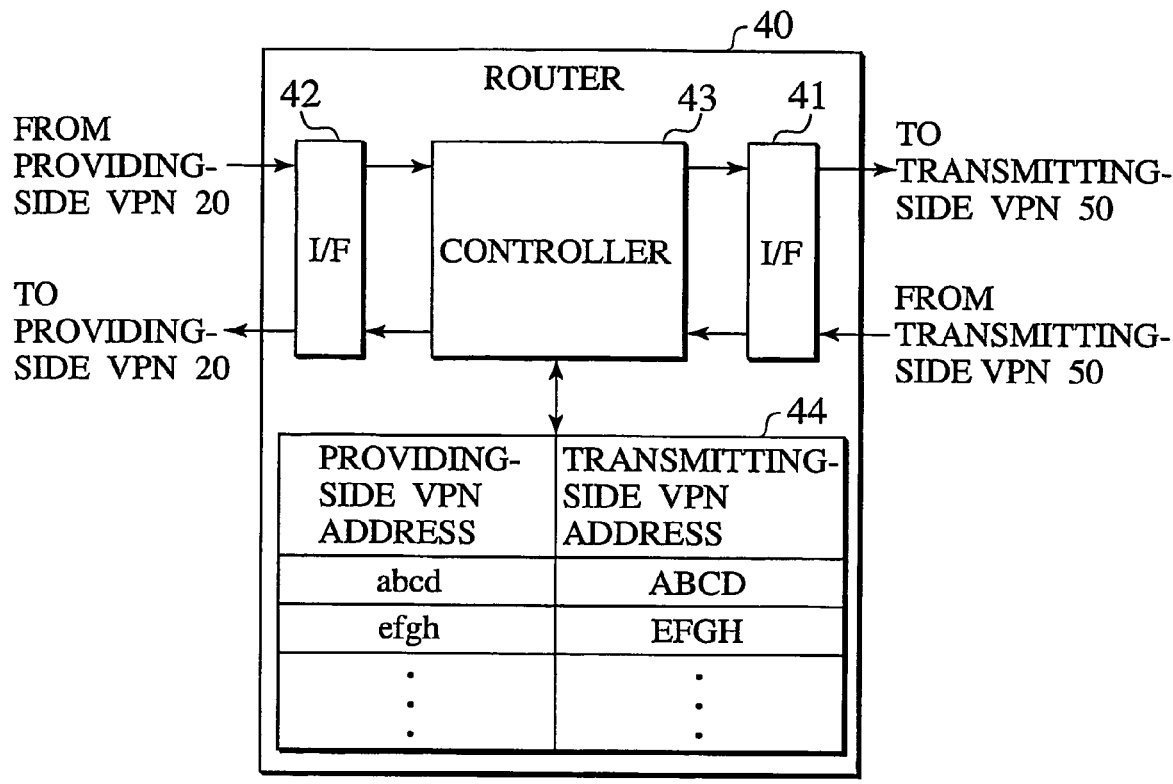

COMMUNICATION SYSTEM AND TRANSFER DEVICE

TECHNICAL FIELD

The present invention relates to a communication system and a transfer device.

BACKGROUND ART

Conventionally, there have been communication systems, which transmit video data to mobile terminals by streaming (for example, "W-CDMA MOBILE COMMUNICATIONS SYSTEM" edited by Keiji Tachikawa, p. 357-360, Maruzen, Jun. 25, 2001). For example, a communication system, which transmits video data by streaming shown in FIG. 1 has been used. In a communication system 401 shown in FIG. 1, a plurality of cameras 410 recording video data, and a streaming server 430 transmitting video data to a plurality of mobile terminals 440 by streaming, connect to a single virtual private network (hereafter, referred to as VPN) 420, and are connected to each other via the VPN 420. In the communication system 401, a camera 410 transmits video data to the streaming server 430 via the VPN 420. The streaming server 430 then obtains and transmits the video data transmitted from the camera 410 to a mobile terminal 440. According to such communication system 410, since the cameras 410 and the streaming server 430 connect to a single VPN 420, there is an advantage that security between the cameras 410 and the streaming server 430 can be ensured.

In the conventional communication system 401, the cameras 410 and the streaming server 430 exchange data through connection to a single VPN 420. As a result, the cameras 410 providing video data, the streaming server 430 obtaining and transmitting the video data to a terminal, and the VPN 420 must have a unified security policy and address architecture.

In addition, since the cameras 410 and the streaming server 430 connect to a single VPN 420, it is necessary to provide as many VPNs 420, each connecting between the cameras 410 providing video data and the streaming server 430 obtaining and transmitting the video data to a terminal, as the number of groups, each needing to ensure security between the cameras 410 and the streaming server 430. As a result, costs for constructing such VPN 420 may increase widely. More specifically, when there are numerous groups that need to ensure security, it is necessary to construct as many VPNs 420 as there are cameras 410 and the streaming server 430 to be connected thereto. As a result, costs have remarkably increased.

An object of the present invention is to provide a communication system, which has high security and can be constructed at low cost, where an information providing-side providing information data and an information transmitting-side transmitting the information data obtained from the information providing-side to a terminal can maintain their own unique security policy, and a transfer device used for the communication system.

DISCLOSURE OF INVENTION

A communication system of the present invention comprises an information providing unit configured to provide information data, an information providing-side network configured to connect the information providing unit and be restricted access, an information transmitter configured to obtain the information data by transmitting request data for requesting the information data to the information providing unit, and transmit obtained information data to a terminal, an information transmitting-side network configured to connect the information transmitter and be restricted access, and a transfer unit configured to connect the information transmitting-side network and the information providing-side network, determine whether or not data received via the information transmitting-side network (hereafter, referred to as transmitting-side data) is data transmitted from the information transmitter, and whether or not data received via the information providing-side network (hereafter, referred to as providing-side data) is data transmitted from the information providing unit, and transfer the transmitting-side data and the providing-side data based on the determination results.

According to such a communication system, the information providing unit connects to the restricted access information providing side network. The information transmitter connects to the restricted access information transmitting-side network. Therefore, the information providing unit and the information transmitter connect to different networks, respectively. The transfer unit determines whether or not transmitting-side data is data transmitted from the information transmitter, and whether or not providing-side data is data transmitted from the information providing unit, and transfers the transmitting-side data and the providing-side data based on the determination results.

Therefore, it is unnecessary to construct a network connecting both the information transmitter and the information providing unit and having a unified security policy. Accordingly, a group of the information transmitter and the information transmitting-side network, and a group of the information providing unit and the information providing-side network, may connect via the transfer unit, while maintaining their own unique security policies, respectively. In addition, the transfer unit determines whether or not transmitting-side data and providing-side data are data that have been transmitted from the information transmitter and the information providing unit, respectively, and transfers data based on the determination results. Accordingly, between the group of the information transmitter and the transmitting-side network and the group of the information providing unit and the providing-side network, only specific data that has been transmitted from the information transmitter or the information providing unit is transmitted. Furthermore, access to the information providing-side network and the information transmitting-side network is restricted, respectively. As a result, the communication system may ensure high security.

Since it is unnecessary to construct a network connecting both the information transmitter and the information providing unit and having a unified security policy, the communication system can be constructed by utilizing the existing information transmitting-side network to which the information transmitter is connected and the existing information providing-side network to which the information providing unit is connected. Accordingly, the communication system can be efficiently constructed at low cost.

In addition, the communication system may comprise a plurality of information providing-side networks, and the transfer unit may connect the information transmitting-side network and the plurality of information providing-side networks. As a result, the information transmitting-side network and the plurality of information providing-side networks can be connected via the transfer unit. Accordingly, even if there are many groups that need to ensure the security between the information providing unit and the information transmitter, it is unnecessary to provide as many transmitting-side networks as the number of groups that need to ensure security, so long as as many information providing-side networks as the number of groups that need to ensure security are provided. It is also unnecessary to provide as many networks to which connects the information providing unit and the information transmitter as the number of groups that need to ensure security. Accordingly, the communication system where the information providing-side and the information transmitting-side may have their own unique security policies can be constructed at low cost.

Furthermore, it is preferable that the transfer unit converts an address attached to data transmitted to the information providing unit from the information transmitter, into an address suitable for the information providing-side network (hereafter, referred to as a providing-side address), and converts an address attached to data transmitted to the information transmitter from the information providing unit, into an address suitable for the information transmitting-side network (hereafter, referred to as a transmitting-side address).

Alternatively, the transfer unit may convert an address attached to data transmitted to the information providing unit from the information transmitter, into an address other than the providing-side address and the transmitting-side address (hereafter, referred to as a common address), convert a converted common address into the providing-side address, convert an address attached to data transmitted to the information transmitter from the information providing unit, into the common address, and convert a converted common address into the transmitting-side address.

Accordingly, the group of the information transmitter and the information transmitting-side network, and the group of the information providing unit and the information providing-side network, may connect via the transfer unit, while maintaining their own unique address architecture, respectively. As a result, since it is unnecessary for the communication system to unify its address architecture, the communication system can be constructed at low cost.

Furthermore, it is preferable that the transfer unit memorizes a threshold value for an amount of the information data from the information providing unit for transfer at once, compares the threshold value with an amount of the information data received from the information providing unit via the information providing-side network, and controls transfer of the transmitting-side data and the providing-side data based on the comparison result. Therefore, by determining the threshold value for the amount of data for transfer at once, according to the processing abilities of the information transmitting-side network, the information providing-side network, the transfer unit, and the information transmitter, the quality of information data transmission by the information transmitter, and the number of terminals receiving information data, the communication system can transfer the transmitting-side data and the providing-side data appropriately according to the processing abilities of the networks and the transfer unit, the quality of information data to be provided, and the number of terminals.

In addition, it is preferable that the communication system transmits video data as the information data. In the communication system of the present invention, between the group of the information transmitter and the transmitting-side network, and the group of the information providing unit and or the providing-side network, only specific data that has been transmitted from the information transmitter or the information providing unit is transmitted. Therefore, the information transmitter can even efficiently receive large-capacity data such as video data. In addition, it is preferable that at least one of the information providing-side network and the information transmitting-side network is a VPN.

A transfer device of the present invention connects an information providing-side network connecting an information providing unit providing information data and being restricted access, and an information transmitting-side network connecting an information transmitter obtaining the information data by transmitting request data for requesting the information data to the information providing unit and transmitting obtained information data to a terminal, and being restricted access, determines whether or not transmitting-side data received via the information transmitting-side network is data transmitted from the information transmitter, and whether or not providing-side data received via the information providing-side network is data transmitted from the information providing unit, and transfers the transmitting-side data and the providing-side data based on the determination results.

BRIEF DESCRIPTION OF DRAWINGS

FIG. 1 is a diagram illustrating a conventional communication system;

FIG. 2 is a diagram illustrating a configuration of a communication system according to a first embodiment of a present invention;

FIG. 3 is a block diagram illustrating a configuration of a router according to the first embodiment of the present invention;

FIGS. 4A through 4D are diagrams illustrating address conversions according to the first embodiment of the present invention;

BEST MODE FOR CARRYING OUT THE INVENTION

FIRST EMBODIMENT (Communication System)

Figure 5:
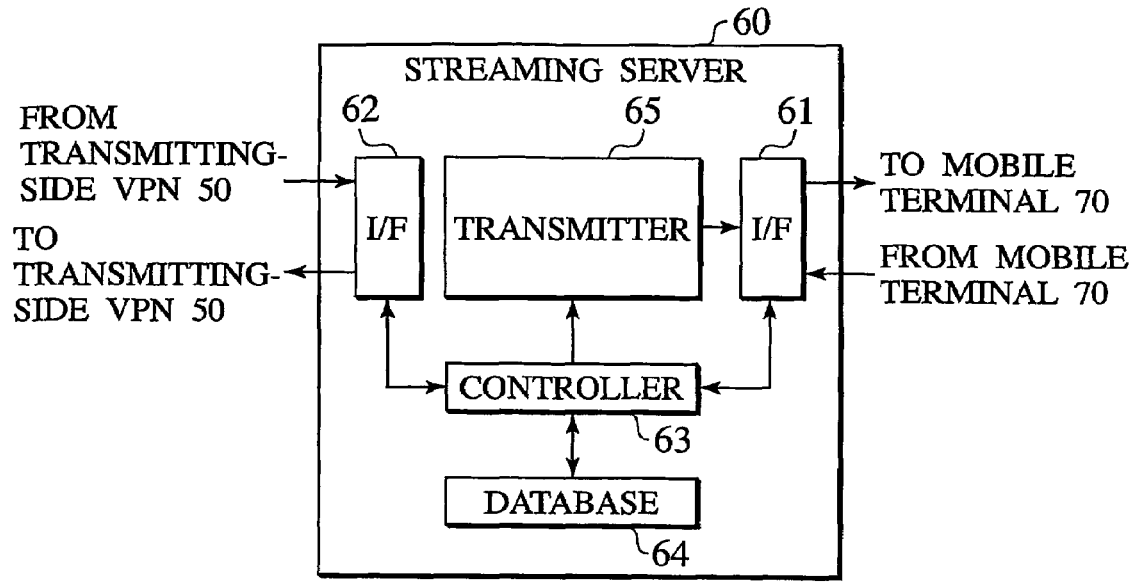
FIG. 5 is a block diagram illustrating a configuration of a streaming server according to the first embodiment of the present invention.

As shown in FIG. 2, a communication system 1 comprises a plurality of video data providing units 10, a providing-side VPN 20, a providing-side server 30, a router 40, a transmitting-side VPN 50, a streaming server 60, and a plurality of mobile terminals 70.

The video data providing units 10 are information providing units, which provide information data. The video data providing units 10 provide video data as information data. Each of the video data providing units 10 provides video data only to mobile terminals 70 used by users who are allowed to receive video data, from an information provider who provides information data such as video data. Note that in order to receive video data, a user of a mobile terminal 70 must be allowed to receive video data from an information provider, and obtain a user ID, a unique caller ID for the mobile terminal 70, or a password.

Each of the video data providing units 10 comprises a camera 11 and a video data providing server 12. The cameras 11 and the video data providing servers 12 are provided at multiple locations, such as an elevator, a private residence, a collective housing including apartments, a kindergarten, a day care center, a school, a public facility, a store, a construction site, or a tourist attraction, where watching and listening real-time video data therefrom is desired by people. As a result, video data includes real-time video data of multiple locations, such as an elevator, a private residence, a collective housing, a kindergarten, a day care center, a school, a public facility, a store, a construction site, or a tourist attraction. As described above, video data includes data for security purposes and corporate data. Each of the video data providing units 10 provides video data to the streaming server 60, in response to a request or an instruction for video data from the streaming server 60. Each of the video data providing units 10 connects to the providing-side VPN 20. Each of the video data providing units 10 then transmits video data to the streaming server 60 via the providing-side VPN 20, the router 40, and the transmitting-side VPN 50.

The providing-side VPN 20 is an information providing-side network, which connects the video data providing units 10 being the information providing unit, and is restricted access. The providing-side VPN 20 connects to the router 40, and connects to the transmitting-side VPN 50 via that router 40. The providing-side VPN 20 comprises an authentication server 21. The authentication server 21 restricts access from video data providing units 10, the providing-side server 30, and other terminals, which attempt to access the providing-side VPN 20, by authentication using user IDs, passwords, or caller IDs. As a result, video data providing units 10 and the providing-side server 30 are subjected to authentication processing when initially accessing and connecting to the providing-side VPN 20. Note that authentication may be carried out using only a caller ID, using a user ID and a password, or using a user ID, a password, and a caller ID. The providing-side server 30 is a server connecting to the providing-side VPN 20. The providing-side server 30 performs various information processing.

The video data providing units 10, the providing-side VPN 20, and the providing-side server 30 have the same security policy, and use the same address architecture. The video data providing units 10, the providing-side VPN 20, and the providing-side server 30A, which have a unified unique security policy and a unified unique address architecture are constructed by an information provider.

The streaming server 60 is an information transmitter, which obtains video data as information data, by transmitting request data for requesting video data to a video data providing unit 10 being the information providing unit, and transmits the obtained video data to a mobile terminal 70. The streaming server 60 connects to the transmitting-side VPN 50, and transmits request data or instruction data including instructions for a video data providing unit 10, to a video data providing unit 10, via the transmitting-side VPN 50, the router 40, and the providing-side VPN 20. In addition, the streaming server 60 connects to a mobile terminal 70 via a radio link and transmits the video data obtained from the video data providing unit 10, to the mobile terminal 70 by streaming.

The streaming server 60 authenticates a user of a mobile terminal 70. In this manner, instead of the video data providing unit 10, the streaming server 60 confirms whether or not a user of mobile terminal 70 is allowed to receive video data from an information provider. The streaming server 60 then transmits request data or instruction data to a video data providing unit 10, in response to a request from only a specific mobile terminal 70 of a user, who has been confirmed as a user allowed to receive video data, by authentication processing. As a result, the video data providing units 10 may provide video data only to a specific mobile terminal 70, which is used by the user allowed to receive it.

The transmitting-side VPN 50 is an information transmitting-side network, which connects the streaming server 60 being the information transmitter, and is restricted access. The transmitting-side VPN 50 connects to the router 40. The transmitting-side VPN 50 connects to the providing-side VPN 20 via the router 40. The transmitting-side VPN 50 comprises an authentication server 51. For the streaming server 60 and other terminals, which attempt to access the transmitting-side VPN 50, the authentication server 51 restricts access using authentication of user IDs, passwords, or caller IDs. As a result, when initially accessing and connecting to the transmitting-side VPN 50, the streaming server 60 is also subjected to authentication processing.

The streaming server 60 and the transmitting-side VPN 50 have the same security policy, and use the same address architecture. The streaming server 60 and the transmitting-side VPN 50 having a unified unique security policy and a unified unique address architecture are constructed by an information transmitter who provides services of transmitting information data such as video data to mobile terminals 70.

The router 40 connects the transmitting-side VPN 50, which is the information transmitting-side network, and the providing-side VPN 20, which is the information providing-side network. The router 40 is a transfer unit, which determines whether or not transmitting-side data received via the transmitting-side VPN 50 is data transmitted from the streaming server 60, and whether or not providing-side data received via the providing-side VPN 20 is data transmitted from a video data providing unit 10, and transfers the transmitting-side data and the providing-side data, based on those determination results. Note that the router 40 has function of routing.

Each of the mobile terminals 70 receives video data by connecting to the streaming server 60 via a radio link. Each of the mobile terminals 70 can receive desirable video data, by requesting the streaming server 60 to transmit the video data by specifying the type of requested video data or the location of a camera 11, or instructing the streaming server 60 to change a recorded object or a recording angle. Each of the mobile terminals 70 decodes and replays the received coded video data.

Next, each configuration is described in detail. To begin with, the router 40 is described in detail. As shown in FIG.

3, the router 40 comprises interfaces (hereafter, referred to as I/F) 41 and 42, a controller 43, and a table 44. The I/F 41 connects to the transmitting-side VPN 50. On the other hand, the I/F 42 connects to the providing-side VPN 20. Thus, since the router 40 comprises the I/F 41 connecting to the transmitting-side VPN 50 and the I/F 42 connecting to the providing-side VPN 20, the router 40 can connect the transmitting-side VPN 50 and the providing-side VPN 20. The I/F 41 receives transmitting-side data via the transmitting-side VPN 50, and inputs the received transmitting-side data to the controller 43. In addition, the I/F 41 transfers the data input from the controller 43 to the streaming server 60 via the transmitting-side VPN 50. Meanwhile, the I/F 42 receives providing-side data via the providing-side VPN 20, and inputs the received providing-side data to the controller 43. In addition, the I/F 42 transfers the data input from the controller 43 to a video data providing unit 10 via the providing-side VPN 20.

The controller 43 controls the transfer of data. To begin with, the controller 43 determines whether or not the transmitting-side data is data that has been transmitted from the streaming server 60, and whether or not the providing-side data is data that has been transmitted from a video data providing unit 10, and controls transfer of the transmitting-side data and the providing-side data based on those determination results. In this case, the router 40 converts an address attached to data that has been transmitted to a video data providing unit 10 from the streaming server 60, into an address suitable for the providing-side VPN 20 (hereafter, referred to as a providing-side VPN address), converts an address attached to data that has been transmitted to the streaming server 60 from a video data providing unit 10, into an address suitable for the transmitting-side VPN 50 (hereafter, referred to as a transmitting-side VPN address), and then transfers the data. Note that the local addresses specified in each network, for example, may be used as a providing-side VPN address and a transmitting-side VPN address. As such, the address is attached to data.

Table 44 stores the addresses given to each of the video data providing units 10 and the streaming server 60. Furthermore, table 44 also stores transmitting-side VPN addresses corresponding to the providing-side VPN addresses, which are given to each of the video data providing units 10. Similarly, table 44 also stores providing-side VPN addresses corresponding to the transmitting-side VPN addresses, which are given to the streaming server 60. FIG. 3 illustrates table 44 when a providing-side VPN address "abcd" is given to a video data providing unit 10 and transmitting-side VPN address corresponding to "abcd" is "ABCD", and a transmitting-side VPN address "EFGH" is given to the streaming server 60 and a providing-side VPN address corresponding to "EFGH" is "efgh".

When the transmitting-side data that the router 40 has received is input from the I/F 41, the controller 43 accesses the table 44 and determines whether or not the source address attached to the transmitting-side data matches the address of the streaming server 60 stored in table 44. For example, it is assumed that the router 40 has received as transmitting-side data a packet 101, which includes request data attached a source address and a destination address as shown in FIG. 4A, via the transmitting-side VPN 50. In this case, since the source address "EFGH" of the packet 101 matches the transmitting-side VPN address of the streaming server 60 stored in table 44, the controller 43 determines that the request data is data transmitted from the streaming server 60.

The controller 43 then obtains the providing-side VPN addresses corresponding to the source address and the destination address indicated by the transmitting-side VPN addresses of the packet 101, by accessing table 44. The controller 43 converts the source address "EFGH" and the destination address "ABCD" indicated by the transmitting-side VPN addresses of the packet 101, into the source address 'efgh' and the destination address 'abcd' indicated by the obtained providing-side VPN addresses, thereby obtains a packet 102 shown in FIG. 4B. Finally, the controller 43 inputs the packet 102 with the converted addresses to the I/F 42, and transfers the packet 102 to a video data providing unit 10 via the providing-side VPN 20.

Similarly, when the providing-side data that the router 40 has received is input from the I/F 42, the controller 43 accesses table 44 and determines whether or not the source address attached to the providing-side data is one of the addresses for the video data providing units 10 stored in the table 44. For example, it is assumed that the router 40 has received as providing-side data a packet 103, which is includes video data attached a source address and a destination address as shown in FIG. 4C, via the providing-side VPN 20. In this case, since the source address "abcd" of the packet 103 matches the providing-side VPN address of a video data providing unit 10 stored in table 44, the controller 43 determines that the video data is data transmitted from the video data providing unit 10.

The controller 43 then obtains the transmitting-side VPN addresses corresponding to the source address and the destination address indicated by the providing-side VPN addresses of the packet 103, by accessing table 44. The controller 43 converts the source address "abcd" and the destination address "efgh" indicated by the providing-side VPN addresses of the packet 103, into the source address "ABCD" and the destination address "EFGH" indicated by the obtained transmitting-side VPN addresses, thereby obtains a packet 104 shown in FIG. 4D. Finally, the controller 43 inputs the I/F 41 the converted packet 104, and transfers the packet 104 to the streaming server 60 via the transmitting-side VPN 50.

Note that when the source address attached to the transmitting-side data that has been received by the router 40, does not match the transmitting-side VPN address of the streaming server 60 stored in table 44, the controller 43 does not transfer and discards the transmitting-side data. Similarly, when the source address attached to the providing-side data that has been received by the router 40, does not match the providing-side VPN addresses of the video data providing units 10 stored in table 44, the controller 43 does not transfer and discards the providing-side data.

Furthermore, the controller 43 memorizes a threshold value for an amount of video data from a video data providing unit 10 for transfer at once. The threshold value for the amount of video data may be set according to the processing abilities of the providing-side VPN 20, the transmitting-side VPN 50, the router 40, and the streaming server 60, the quality when the streaming server 60 transmits video data to a mobile terminal 70, and the number of mobile terminals, which receive video data by connecting to streaming server 60 via a radio link. Note that the amount of video data for transfer at once may be, for example, represented by the amount of data for transfer per unit time, that is, by the transfer speed.

The controller 43 compares the threshold value with the amount of video data that has been transmitted from a video data providing unit 10 and received by the router 40 via the providing-side VPN 20. Note that the amount of video data received by the router 40 may also be represented by, for example, the amount of data to be received by the router 40 per unit time, that is, by the data transfer speed of the providing-side VPN 20. The controller 43 then controls transfer of the transmitting-side data and the providing-side data based on the comparison result. More specifically, when the controller 43 receives request data to a new video data providing unit 10, which is not currently providing video data, from the streaming server 60, the controller 43 transfers the request data, when the amount of video data being received by the router 40 via the providing-side VPN 20 is less than the threshold value.

Meanwhile, when the controller 43 receives request data to a new video data providing unit 10, which is not currently providing video data, from the streaming server 60, the controller 43 does not transfer the request data, when the amount of video data received by the router 40 via the providing-side VPN 20 is more than or equal to the threshold value. Furthermore, the controller 43 notifies the streaming server 60 that the transfer of the request data has been rejected. More specifically, the controller 43 inputs the I/F 41 notification of transfer rejection. The I/F 41 then transmits the notification of transfer rejection to the streaming server 60 via the transmitting-side VPN 50. Thus, if the amount of video data from a video data providing unit 10 for transfer at once reaches the threshold value, the router 40 rejects a new request for video data from the streaming server 60. As a result, the router 40 can avoid transferring excessive request data.

Note that such router 40 may be implemented by making a computer run a program for causing a computer to function as a transfer device, which connects the information providing-side network and the information transmitting-side network, determines whether or not transmitting-side data is data that has been transmitted from the information transmitter, or whether or not providing-side data is data that has been transmitted from the information providing unit, and transfers the transmitting-side data and providing-side data based on the determination results.

Next, the streaming server 60 is described in detail. As shown in FIG. 5, the streaming server 60 comprises I/Fs 61 and 62, a controller 63, a database 64, and a transmitter 65. The I/F 61 connects to mobile terminals 70 via radio links, and transmits/receives data to/from mobile terminals 70. The I/F 61 receives a user ID, a password, and an caller ID for authentication, a request for video data by specifying the type of requested video data or the location of a camera 11, and an instruction for changing a recorded object or a recording angle, from a mobile terminal 70. The I/F 61 inputs the user ID, the password, the caller ID, the request, and the instruction received from a certain mobile terminal 70 to the controller 63. In addition, video data is input to the I/F 61 from the transmitter 65. Control data such as instructions and notifications from the streaming server 60 to the mobile terminal 70 is also input to the I/F 61 from the controller 63. The I/F 61 transmits the input video data and control data to the mobile terminal 70 via the radio link.

The I/F 62 connects to the transmitting-side VPN 50. The I/F 62 receives video data from a video data providing unit 10 via the transmitting-side VPN 50. In addition, the I/F 62 receives notification of transfer rejection from the router 40 via the transmitting-side VPN 50. The I/F 62 inputs to the controller 63 the received video data and notification of transfer rejection. In addition, a packet including request data or instruction data is input to the I/F 62 from the controller 63. The I/F 62 transmits the input packet including request data or instruction data to a video data providing unit 10 via the transmitting-side VPN 50.

The database 64 stores user information, such as a user ID, a password, and a caller ID, which have been given to a user of a mobile terminal 70 by an information provider. The database 64 also stores information concerning the video data providing units 10, such as the type of video data provided from each video data providing unit 10, locations where each of the video data providing units 10 is located, and addresses, which are given to each of the video data providing units 10 and indicated by the transmitting-side VPN addresses. In addition, the database 64 stores control information to be used for obtaining video data by transmitting request data or instruction data.

The controller 63 controls transmission of the request data or instruction data to each of the video data providing units 10. The controller 63 also controls transmission of the obtained video data to a mobile terminal 70. In addition, the controller 63 authenticates users of the mobile terminals 70. To begin with, when a request for video data from a mobile terminal 70 is input from the I/F 61, the controller 63 asks a mobile terminal 70 to transmit its user ID, password, and caller ID, and authenticates them. More specifically, once the controller 63 receives the user ID, the password, and the caller ID from the mobile terminal 70 via the I/F 61, it then accesses the database 64 and determines whether or not the user ID, the password, and the caller ID match those stored in the database 64. If the user ID, the password, and the caller ID do not match, the controller 63 once again asks the mobile terminal 70 to transmit its user ID, password, and caller ID. If the user ID, the password, and the caller ID do not match those stored in the database 64, even if authentication is carried out a specified number of times, the controller 63 rejects the request for video data from the mobile terminal 70.

Otherwise, if the user ID, the password, and the caller ID match and the user of the mobile terminal 70 is confirmed as being allowed to receive video data, the controller 63 accesses the database 64 and retrieves an address, which is indicated by the transmitting-side VPN address, for a video data providing unit 10 providing video data of a type or a location requested by the mobile terminal 70. The controller 63 then sets the address of a video data providing unit 10 indicated by the transmitting-side VPN address as a destination address, sets the address of the streaming server 60 indicated by the transmitting-side VPN address as a source address, and generates a packet 101 as shown in FIG. 4A including request data for requesting video data, which type and location of the video data are specified. The controller 63 inputs the generated packet 101 to the I/F 62 and instructs it to transmit to the video data providing unit 10. In addition, when the controller 63 receives an instruction from the authorized mobile terminal 70 from the I/F 61, it then generates a packet including instruction data to transmit to the video data providing unit 10, as with the case of generating a packet including request data, and inputs it to the I/F 62. In this manner, the controller 63 requests and instructs a video data providing unit 10 to provide video data.

When transmitting request data or instruction data to a video data providing unit 10, the controller 63 gives a sequence number to the request data or instruction data. The controller 63 records control information, which the sequence numbers given to the request data and instruction data are associated with the address of a mobile terminal 70 transmitting the request and instruction to the streaming server 60, to the database 64.

Video data obtained from a video data providing unit 10 is input to the controller 63 via the I/F 62. Video data is given the same sequence number as that of the request data or instruction data, which has been transmitted in order to obtain the video data. The controller 63 accesses the database 64 based on the sequence number given to the video data and retrieves the address of a specific mobile terminal 70 transmitting a request or an instruction of the video data. The controller 63 then inputs the obtained video data attached with address of the mobile terminal 70 to the transmitter 65, and instructs it to transmit to the mobile terminal 70. The transmitter 65 transmits the video data input from the controller 63 to the mobile terminal 70 via the I/F 61. The transmitter 65 transmits the video data by streaming. Note that when the I/F 62 receives notification of transfer rejection from the router 40, the controller 63 generates congestion notification, which notify the mobile terminal 70 that video data cannot be provided since the network is currently congested. The controller 63 inputs the I/F 61 the generated congestion notification. The I/F 61 then transmits the congestion notification to the mobile terminal 70.

Figure 6:
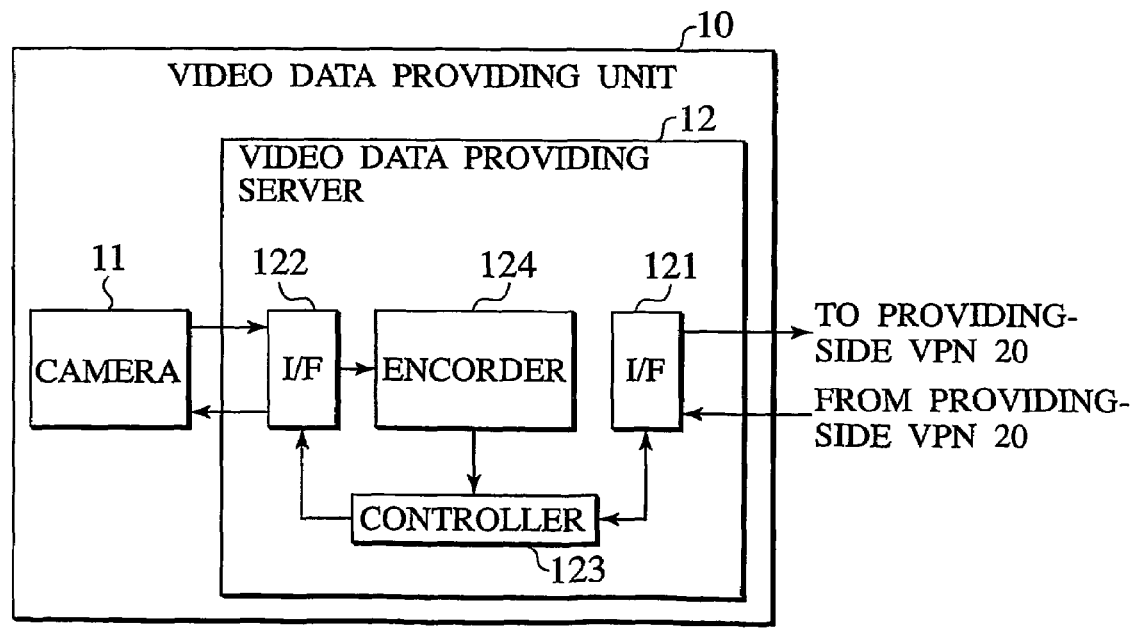
FIG. 6 is a block diagram illustrating a configuration of a video data providing unit according to the first embodiment of the present invention.

Next, a video data providing unit 10 is described in detail. As shown in FIG. 6, a video data providing unit 10 comprises a camera 11 and a video data providing server 12. The camera 11 is a recording unit, which records video data. The camera 11 operates according to instructions input from the video data providing server 12. For example, the camera 11 receives an instruction for inputting recorded video data or changing a recorded object and/or a recording angle, from the video data providing server 12. The camera 11 records according to the instruction from the video data providing server 12, and inputs video data recorded in real time, to the video data providing server 12.

The video data providing server 12 controls the camera 11 based on request data or instruction data from the streaming server 60, and provides video data recorded by the camera 11 to the streaming server 60. The video data providing server 12 comprises I/Fs 121 and 122, a controller 123, and an encoder 124. The I/F 121 connects to the providing-side VPN 20. The I/F 211 receives request data or instruction data from the streaming sever 60 via the providing-side VPN 20. The I/F 121 inputs the received request data or instruction data to the controller 123. In addition, video data is input to the I/F 121 from the controller 123. The I/F 121 then transmits the video data input from the controller 123 to the streaming server 60 via the providing-side VPN 20.

The I/F 122 connects to the camera 11. The I/F 122 inputs the camera 11 an instruction input from the controller 123. In addition, the I/F 122 inputs the video data input from the camera 11 to the encoder 124. The encoder 124 encodes the video data input from the I/F 122. The encoder 124 then inputs the encoded video data to the controller 123.

The controller 123 instructs and controls the camera 11 based on the request data or instruction data input from the I/F 121. The controller 123 inputs an instruction of the camera 11 to the I/F 122. In addition, the controller 123 gives the same sequence number to the video data input from the encoder 124 as that given to the request data or instruction data regarding the video data. In addition, the controller 123 stores the address of the streaming server 60 indicated by the providing-side VPN address. The controller 63 then sets the address of the streaming server 60 indicated by the providing-side VPN address as a destination address, sets the address of the video data providing unit 10 indicated by the providing-side VPN address as a source address, and generates a packet 103 including video data as shown in FIG. 4C. The controller 63 inputs the generated packet 103 to the I/F 121 and instructs it to transmit to the streaming server 60.

(Communication Method)

Figure 7:
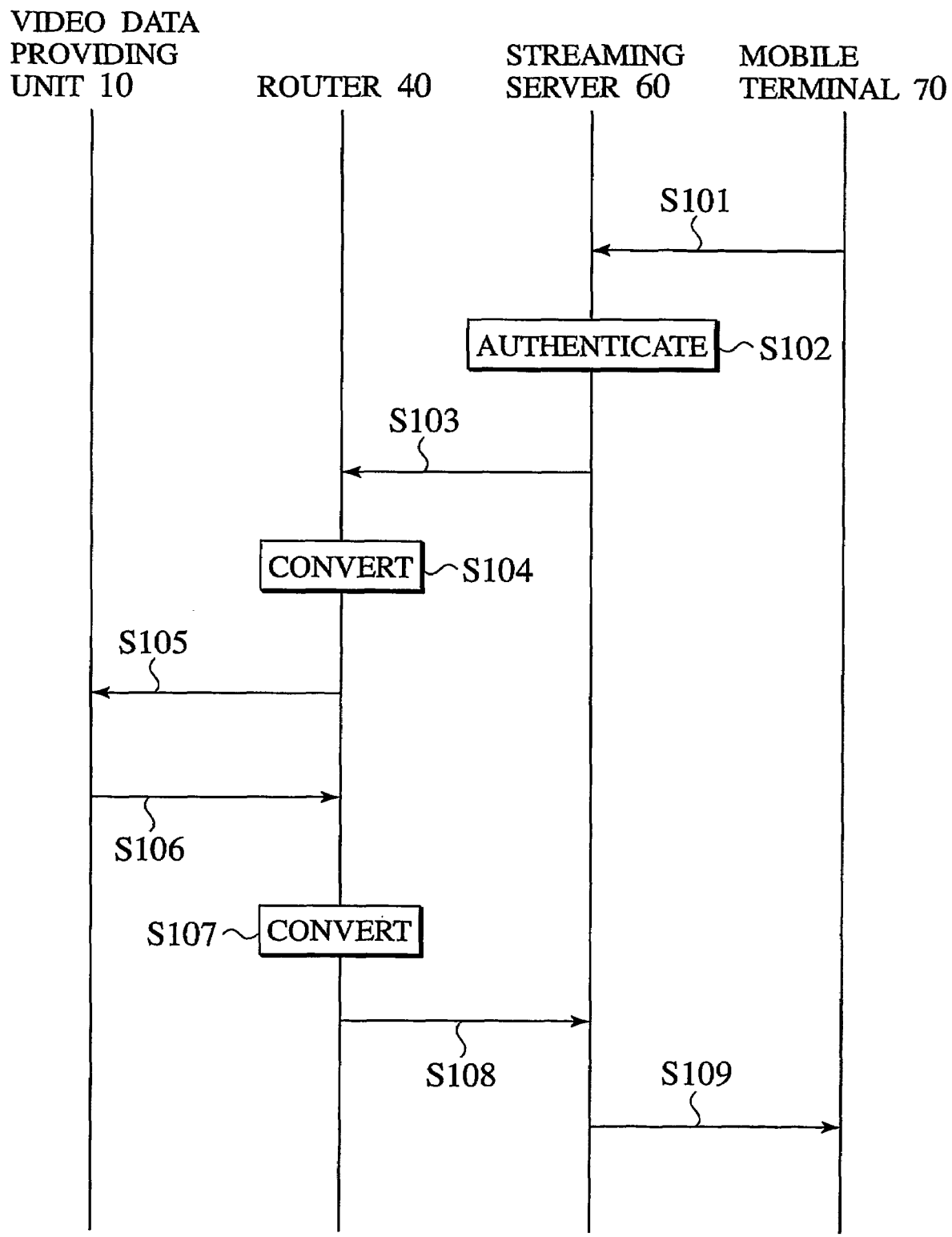
FIG. 7 is a flow chart illustrating a procedure for a communication method according to the first embodiment of the present invention.

Next, a communication method using the communication system 1 shown in FIG. 2 is described. As shown in FIG. 7, to begin with, a mobile terminal 70 requests video data to the streaming server 60 (S101). The streaming server 60 asks the mobile terminal 70 to transmit a user ID, password, and caller ID, and authenticates them (S102). When a user of the mobile terminal 70 is determined as being allowed to receive video data from an information provider, the streaming server 60 transmits a packet including request data to a video data providing unit 10, based on the request from the mobile terminal 70 (S103). In this case, an address indicated by the transmitting-side VPN address is attached to the request data.

The router 40 receives as transmitting-side data a packet including request data from the streaming server 60 via the transmitting-side VPN 50. The router 40 converts the address indicated by the transmitting-side VPN address, which is attached to the request data, into the address indicated by the providing-side VPN address (S104). The router 40 then transfers the packet including request data attached the address indicated by the providing-side VPN address, to the video data providing unit 10 (S105). The video data providing unit 10 transmits video data corresponding to the received request data to the streaming server 60 (S106). In this case, an address indicated by the providing-side VPN address is attached to the video data.

The router 40 receives a packet including video data from the video data providing unit 10, as providing-side data, via the providing-side VPN 20. The router 40 converts the address indicated by the providing-side VPN address attached to the video data, into the address indicated by the transmitting-side VPN address (S107). The router 40 then transfers the packet including video data attached to the address indicated by the transmitting-side VPN address, to the streaming server 60(S108). The streaming server 60 transmits video data obtained from the video data providing unit 10 to the mobile terminal 70 (S109).

According to the communication system 1, router 40, and communication method, the video data providing units 10 connect to the restricted access providing-side VPN 20, and the streaming server 60 connects to the restricted access transmitting-side VPN 50. Therefore, the video data providing units 10 and the streaming server 60 connect to different networks, respectively. The router 40 determines whether or not transmitting-side data such as request data or instruction data received via the transmitting-side VPN 50 is data that has been transmitted from the streaming server 60. In addition, the router 40 determines whether or not providing-side data such as video data received via the providing-side VPN is data that has been transmitted from a video data providing unit 10. The router 40 then transfers the transmitting-side data and providing-side data based on those determination results.

Therefore, it is unnecessary to construct a network connecting both the streaming server 60 and the video data providing units 10 with a unified security policy. Accordingly, a group of the streaming server 60 and the transmitting-side VPN 50, and a group of a video data providing unit 10 and the providing-side VPN 20, may connect via the router 40, while maintaining their own unique security policies, respectively. In addition, the router 40 determines whether or not transmitting-side data and providing-side data are data that have been transmitted from the streaming server 60 and a video data providing unit 10, respectively, and transfers data based on that determination result.

Accordingly, the group of the streaming server 60 and the transmitting-side VPN 50, and the group of the video data providing unit 10 and the providing-side VPN 20, only specific data that has been transmitted from the streaming server 60 or the video data providing unit 10 is transmitted. Furthermore, access to the providing-side VPN 20 and the transmitting-side VPN 50 is restricted, respectively. As a result, the high security of communication system 1 may be ensured.

Since it is unnecessary to construct a network connecting both the streaming server 60 and the video data providing unit 10, with a unified security policy, the communication system 1 can be constructed utilizing the existing transmitting-side VPN 50 connecting the streaming server 60 and the existing providing-side VPN 20 connecting the video data providing unit 10, thereby provide video data providing services. Accordingly, the communication system 1 can be efficiently constructed at low cost.

In addition, in the communication system 1, between the group of the streaming server 60 and the transmitting-side VPN 50, and the group of the video data providing unit 10 and the providing-side VPN 20, only specific data that has been transmitted from the streaming server 60 or the video data providing unit 10 is transmitted. Therefore, the streaming server 60 can even efficiently receive large-capacity data such as video data.

Furthermore, the router 40 converts the address attached to data transmitted to a video data providing unit 10 from the streaming server 60, into the providing-side VPN address, and converts the address attached to video data transmitted to the streaming server 60 from the video data providing unit 10, into the transmitting-side VPN address. Accordingly, the group of the streaming server 60 and the transmitting-side VPN 50, and the group of the video data providing unit 10 and the providing-side VPN 20, may connect via the router 40 while maintaining their own unique address architecture, respectively. As a result, since it is unnecessary for the communication system 1 to unify the address architecture, the communication system 1 can be constructed at low cost. In addition, the video data providing unit 10 can provide video data providing services utilizing its own unique address.

Furthermore, the router 40 stores a threshold value for the amount of video data from the video data providing unit 10 for transfer at once. The router 40 then compares the threshold value with the amount of video data received via the providing-side VPN 20, which has been transmitted from the video data providing unit 10, and controls transfer of the transmitting-side data and the providing-side data based on the comparison result. In addition, the threshold value for the amount of data for transfer at once may be defined according to the processing abilities of the providing-side VPN 20, the transmitting-side VPN 50, the router 40, and the streaming server 60, the quality of video data transmission to the mobile terminal 70 from the streaming server 60, and the number of mobile terminals 70 connecting via a radio link to the streaming server 60 and receiving video data. Therefore, the router 40 can transfer data appropriately according to the processing abilities of the providing-side VPN 20, the transmitting-side VPN 50, the router 40, and the streaming server 60, the quality of video data transmission to the mobile terminal 70 from the streaming server 60, and the number of mobile terminals 70 receiving video data.

SECOND EMBODIMENT

Figure 8:
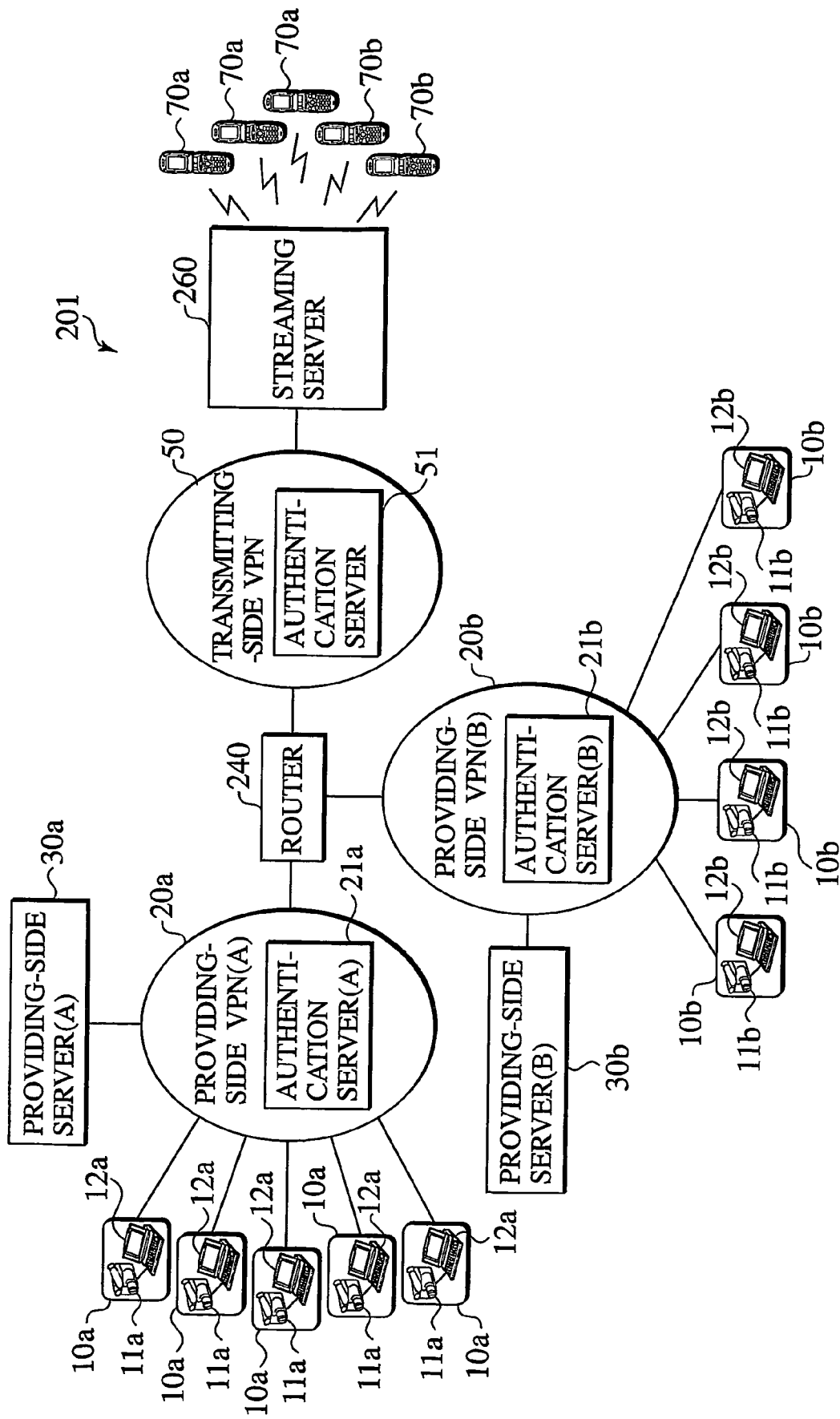
FIG. 8 is a diagram illustrating a configuration of a communication system according to a second embodiment of the present invention.

Next, a second embodiment of the present invention is described. As shown in FIG. 8, a communication system 201 comprises a plurality of video data providing units (A) 10a, a providing-side VPN (A) 20a, a providing-side server (A) 30a, a plurality of video data providing units (B) 10b, a providing-side VPN (B) 20b, a providing-side server (B) 30b, a router 40, a transmitting-side VPN 50, a streaming server 260, a plurality of mobile terminals (A) 70a, and a plurality of mobile terminals (a) 70b. The transmitting-side VPN 50 is the same as the transmitting-side VPN 50 shown in FIG. 2.

The video data providing units (A) 10a comprises a camera (A) 11a and a video data providing server (A) 12a. The video data providing units (A) 10a connect to the providing-side VPN (A) 20a. Each of the video data providing units (A) 10a then transmits video data to the streaming server 260 via the providing-side VPN (A) 20a, the router 240, and the transmitting-side VPN 50. The video data providing units (A) 10a provides video data only to a specific mobile terminal (A) 70a, which is used by a user allowed to receive video data from an information provider A. Note that the mobile terminal (A) 70a is a mobile terminal used by a user who has been allowed to receive video data from the information provider A and has obtained a user ID, a password, and an caller ID for receiving video data.

The providing-side VPN (A) 20a is an information providing-side network connecting the video data providing units (A) 10a and being restricted access. The providing-side VPN (A) 20a connects to the router 240, and connects to the transmitting-side VPN 50 via the router 240. The providing-side VPN (A) 20a comprises an authentication server (A) 21a. For a video data providing unit (A) 10a, the providing-side server (A) 30a, and other terminals, which attempt to access the providing-side VPN (A) 20a, the authentication server (A) 21a restricts access using authentication of user IDs, passwords, and caller IDs. The providing-side server (A) 30a is a server connecting to the providing-side VPN (A) 20a. The providing-side server (A) 30a performs various information processing.

The video data providing units (A) 10a, the providing-side VPN (A) 20a, and the providing-side server (A) 30a have the same security policy, and use the same address architecture. The video data providing unit (A) 10a, the providing-side VPN (A) 20a, and the providing-side server (A) 30a, which have a unified unique security policy and a unified unique address architecture are constructed by an information provider A.

The video data providing units (B) 10b comprises a camera (B) 11b and a video data providing server (B) 12b. The video data providing units (B) 10b connect to the providing-side VPN (B) 20b. The video data providing units (B) 10B then transmit video data to the streaming server 260 via the providing-side VPN (B) 20b, the router 240, and the transmitting-side VPN 50. The video data providing units (B) 10b provide video data only to a specific mobile terminal (B) 70b used by a user who has been allowed to receive video data from an information provider B. Note that the mobile terminals (B) 70b is a mobile terminal used by a user who has been allowed to receive video data from the information provider B and has obtained a user ID, a password, and a caller ID for receiving video data.

The providing-side VPN (B) 20b is an information providing-side network connecting the video data providing units (B) 10b and being restricted access. The providing-side VPN (B) 20b connects to the transmitting-side VPN 50, and connects to the transmitting-side VPN 50 via the router 240. The providing-side VPN (B) 20b comprises an authentication server (B) 21b. For a video data providing unit (B) 10b, the providing-side server (B) 30b, and other terminals, which attempt to access the providing-side VPN (B) 20b, the authentication server (B) 21b restricts access using authentication of user IDs, passwords, and caller IDs. The providing-side server (B) 30b is a server connecting to the providing-side VPN (B) 20b. The providing-side server (B) 30b performs various information processing.

The video data providing units (B) 10b, the providing-side VPN (B) 20b, and the providing-side server (B) 30b have the same security policy, and use the same address architecture. The video data providing units (B) 10b, the providing-side VPN (B) 20b, and the providing-side server (B) 30b, which have a unified unique security policy and a unified unique address architecture constructed by an information provider B that differs from the information provider A.

As such, the communication system 201 comprises a plurality of information providing-side networks, such as the providing-side VPN (A) 20a and the providing-side VPN (B) 20b. The video data providing units (A) 10a and the video data providing units (B) 10b connect to a plurality of information providing-side networks, that is, the providing-side VPN (A) 20a and the providing-side VPN (B) 20b, respectively. More specifically, as described above, a plurality of video data providing units (A) 10a, which have the same security policy and use the same address architecture as the providing-side VPN (A) 20a, connect to the providing-side VPN (A) 20a. On the other hand, a plurality of video data providing units (B) 10b, which have the same security policy and use the same address architecture as the providing-side VPN (B) 20b, connect to the providing-side VPN (B) 20b. Thus, in the communication system 201, there are s plurality of groups that need to ensure the security between an information providing unit and the streaming server 260, including a group between the streaming server 260 and the video data providing units (A) 10a, and a group between the streaming server 260 and the video data providing units (B) 10b.

When receiving a request or an instruction for the video data providing unit (A) 10a from a mobile terminal, the streaming server 260 performs authentication processing in order to confirm whether or not the user of the mobile terminal is allowed to receive video data from the information provider A. The streaming server 260 then transmits request data or instruction data to the video data providing unit (A) 10a, in response to a request only from the mobile terminal (A) 70a used by a user who has been confirmed as being allowed to receive video data from the information provider A. The streaming server 260 then transmits to the mobile terminal (A) 70a video data, which is obtained by transmitting request data or instruction data to the video data providing unit (A) 10a.

Similarly, when receiving a request or an instruction for the video data providing unit (B) 10b from a mobile terminal, the streaming server 260 performs authentication processing, which confirms whether or not a user of the mobile terminal is allowed to receive video data from the information provider B. The streaming server 260 then transmits request data or instruction data to the video data providing unit (B) 10b, in response to a request only from the mobile terminal (B) 70b used by a user who has been confirmed as being allowed to receive video data from the information provider B. The streaming server 260 then transmits to the mobile terminal (B) 70b video data, which is obtained by transmitting request data or instruction data to the video data providing unit (B) 10b.

As a result, the video data providing units (A) 10a can provide video data only to a mobile terminal (A) 70a, which is used by a user allowed by the video data provider A. On the other hand, each of the video data providing units (B) 10b can provide video data only to a mobile terminal (B) 70b, which is used by a user allowed by the video data provider B. Otherwise, the streaming server 260 is substantially the same as the streaming server 60 shown in FIGS. 2 and 5.

Figure 9:
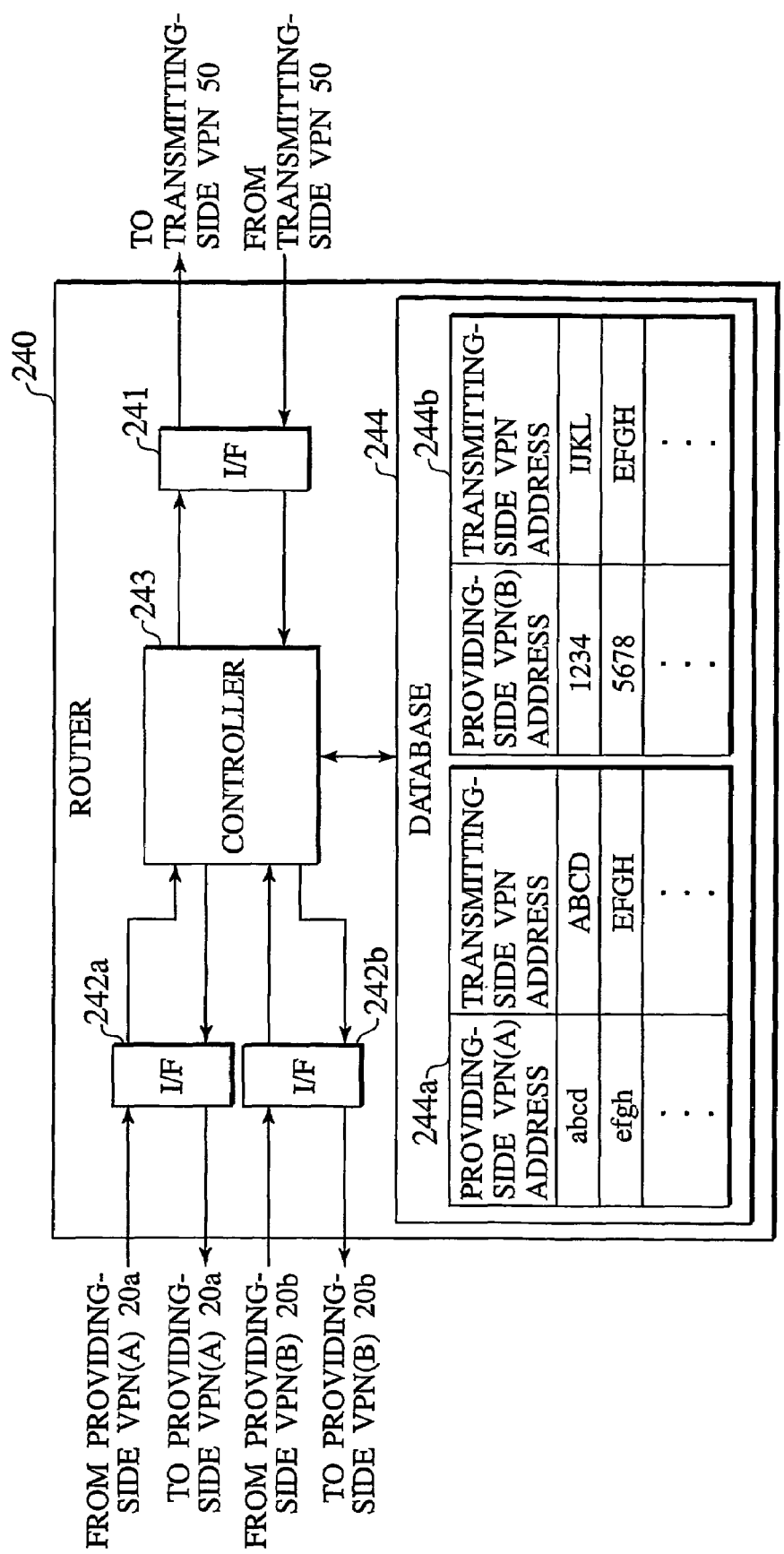
FIG. 9 is a block diagram illustrating a configuration of a router according to the second embodiment of the present invention.

As shown in FIG. 9, the router 240 comprises I/Fs 241, 242a, and 242b, a controller 243, and a database 244. The I/F 241 connects to the transmitting-side VPN 50. The I/F 242a connects to the providing-side VPN (A) 20a. The I/F 242b connects to the providing-side VPN (B) 20b. Thus, since the router 240 comprises the I/F 241 connecting to the transmitting-side VPN 50, the I/F 242a connecting to the providing-side VPN (A) 20a, and the I/F 242b connecting to the providing-side VPN (B) 20b, the router 240 may connect the transmitting-side VPN 50 and the providing-side VPN (A) 20a, and the transmitting-side VPN 50 and the providing-side VPN (B) 20b, respectively. In other words, if the router 240 has as many I/Fs, which connect to the respective information providing-side networks, as the number of information providing-side networks, the router 240 may connect between the information transmitting-side network and a plurality of information providing-side networks, respectively. Note that the router 240 has function of routing.

The I/F 241 is substantially the same as the I/F 41 shown in FIG. 2. Meanwhile, the I/F 242a receives providing-side data via the providing-side VPN (A) 20a, and inputs the received providing-side data to the controller 243. In addition, the I/F 242a transfers data input from the controller 243 to the video data providing unit (A) 10a via the providing-side VPN (A) 20a. The I/F 242b receives providing-side data via the providing-side VPN (B) 20b, and inputs the received providing-side data to the controller 243. In addition, the I/F 242b transfers data input from the controller 243 to the video data providing unit (B) 10b via the providing-side VPN (B) 20b.

The controller 243 determines whether or not the transmitting-side data received via the transmitting-side VPN 50 is data that has been transmitted from the streaming server 260, and whether or not the providing-side data received via the providing-side VPN (A) 20a or the providing-side VPN (B) 20b is data that has been transmitted from the video data providing unit (A) 10a or the video data providing unit (B) 10b, and controls transfer of the transmitting-side data and the providing-side data based on those determination results.

In this case, the router 240 converts the address attached to data that has been transmitted to the video data providing unit (A) 10a from the streaming server 260, into an address suitable for the providing-side VPN (A) 20a (hereafter, referred to as a providing-side VPN (A) address), converts the address attached to data that has been transmitted to the video data providing unit (B) 10b from the streaming server 260, into an address suitable for the providing-side VPN (B) 20b (hereafter, referred to as a providing-side VPN (B) address), converts the address attached to data that has been transmitted to the streaming server 260 from the video data providing unit (A) 10a or the video data providing unit (B) 10b, into a transmitting-side VPN address, and then transfer data.

The database 244 comprises tables 244a and 244b. Table 244a stores addresses given to each of the video data providing units (A) 10*a* and the streaming server 260. Furthermore, table 244*a* stores transmitting-side VPN addresses corresponding to the providing-side VPN (A) addresses, which are given to each of the video data providing units (A) 10 In addition, table 244*a* stores providing-side VPN (A) addresses corresponding to the transmitting-side VPN addresses, which are given to the streaming server 260. FIG. 9 illustrates table 244*a*, which: a providing-side VPN (A) address "abcd" is given to the video data providing unit (A) 10*a* and corresponding transmitting-side VPN address is "ABCD"; and a transmitting-side VPN address "EFGH" is given to the streaming server 260 and corresponding providing-side VPN (A) address is "efgh".

On the other hand, table 244*b* stores addresses given to each of the video data providing units (B) 10*b* and the streaming server 260. Furthermore, table 244*b* stores transmitting-side VPN addresses corresponding to the providing-side VPN (B) addresses, which are given to each of the video data providing units (B) 10*b*. In addition, table 244*b* stores providing-side VPN (B) addresses corresponding to the transmitting-side VPN addresses, which are given to the streaming server 260. FIG. 9 illustrates table 244*b*, which a providing-side VPN (B) address "1234" is given to the video data providing unit (B) 10*b* and corresponding transmitting-side VPN address is "IJKL" and a transmitting-side VPN address "EFGH" is given to the streaming server 260 and corresponding providing-side VPN (B) address is "5678".

When the controller 243 receives the transmitting-side data, which the router 240 have received, from the I/F 241, it then accesses tables 244*a* and 244*b* and determines whether or not the source address attached to the transmitting-side data matches the address of the streaming server 260 stored in tables 244*a* and 244*b*. In the case of FIG. 9, when the source address matches the transmitting-side VPN address of the streaming server 260 "EFGH" stored in tables 244*a* and 244*b*, the controller 243 determines that the transmitting-side data, such as request data or instruction data, is data that has been transmitted from the streaming server 260.

The controller 243 then accesses tables 244*a* and 244*b*, and retrieves a destination address indicated by the transmitting-side VPN address. For example, when a destination address is "ABCD" and matches the transmitting-side VPN address stored in table 244*a*, the controller 243 obtains the providing-side VPN (A) addresses corresponding to the source address "EFGH" and the destination address "ABCD", which are indicated by the transmitting-side VPN addresses, from table 244*a*.

The controller 243 converts the source address "EFGH" indicated by the transmitting-side VPN address into the obtained providing-side VPN (A) address "efgh", and converts the destination address "ABCD" indicated by the transmitting-side VPN address into the obtained providing-side VPN (A) address "abcd". Finally, since the destination address is "abcd" indicated by the providing-side VPN (A) address, the controller 243 determines that the received request data or instruction data is to be transmitted to the video data providing unit (A) 10*a*. The controller 243 then inputs a packet including request data or instruction data, which is attached the converted source address and the converted destination address to the I/F242*a*, and transfers the packet to the video data providing unit (A) 10*a* via the providing-side VPN (A) 20*a*.

Meanwhile, when a destination address is "IJKL" and matches the transmitting-side VPN address stored in table 244*b*, the controller 244 obtains the providing-side VPN (B) addresses corresponding to the source address "EFGH" and the destination address "IJKL", which are indicated by the transmitting-side VPN addresses, from table 244*b*. The controller 243 converts the source address "EFGH" indicated by the transmitting-side VPN address into the obtained providing-side VPN (B) address "5678", and converts the destination address "IJKL" indicated by the transmitting-side VPN address into the obtained providing-side VPN (B) address "1234". Finally, since the destination address is "1234" indicated by the providing-side VPN (B) address, the controller 243 determines that the received request data or instruction data is to be transmitted to the video data providing unit (B) 10*b*. The controller 243 then inputs a packet including request data or instruction data, which is attached the converted source address and the converted destination address to the I/F242*b*, and transfers the packet to the video data providing unit (B) 10*b* via the providing-side VPN (B) 20*b*.

When the controller 243 receives video data, which the router 240 has received via the providing-side VPN (A) 20*a*, from the I/F 242*a*, it then accesses table 244*a* and determines whether or not the source address attached to the video data matches the address of the video data providing unit (A) 10*a* stored in table 244*a*. In the case of FIG. 9, when the source address matches the providing-side VPN (A) address "abcd" of the video data providing unit (A) 10*a* stored in table 244*a*, the controller 243 determines that the video data being the providing-side data is the data that has been transmitted from the video data providing unit (A) 10*a*.

The controller 243 then accesses the table 244*a* and obtains transmitting-side VPN addresses corresponding to the source address "abcd" and the destination address "efgh", which are indicated by the providing-side VPN (A) addresses. The controller 243 converts the source address "abcd" indicated by the providing-side VPN (A) address into the obtained transmitting-side VPN address "ABCD", and converts the destination address "efgh" indicated by the providing-side VPN (A) address into the obtained transmitting-side VPN (A) address "EFGH". Finally, the controller 243 inputs a packet including video data, which is attached the converted source address and the converted destination address to the I/F 241, and transfers the packet to the streaming server 60 via the transmitting-side VPN 50.

Meanwhile, when the controller 243 receives video data, which the router 240 has received via the providing-side VPN (B) 20*b*, from the I/F 242*b*, it then accesses table 244*b* and determines whether or not the source address attached to the video data matches the address of the video data providing unit (B) 10*b* stored in table 244*b*. In the case of FIG. 9, when the source address matches the providing-side VPN (B) address "1234" of the video data providing unit (B) 10*b* stored in table 244*b*, the controller 243 determines that the video data being the providing-side data is data that has been transmitted from the video data providing unit (B) 10*b*.

The controller 243 then accesses the table 244*b* and obtains transmitting-side VPN addresses corresponding to the source address "1234" and the destination address "5678", which are indicated by the providing-side VPN (B) addresses. The controller 243 converts the source address "1234" indicated by the providing-side VPN (B) address into the obtained transmitting-side VPN address "IJKL", and the destination address "5678" indicated by the providing-side VPN (B) address into the obtained transmitting-side VPN address "EFGH". Finally, the controller 243 inputs a packet including video data, which is attached the converted source address and the converted destination address to the I/F 241, and transfers the packet to the streaming server 60 via the transmitting-side VPN 50.

Note that when the source address attached to the transmitting-side data that has been received by the router 240, does not match the transmitting-side VPN address of the streaming server 60 stored in the table 244a or 244b, the controller 243 does not transfer and discards the data. Similarly, when the source address attached to the providing-side data that has been received by the router 240 via the providing-side VPN (A) 20a or the providing-side VPN (B) 20b, does not match the addresses of the video data providing unit (A) 10a and video data providing unit (B) 10b, which are indicated by the providing-side VPN (A) address and the providing-side VPN (B) address, respectively, and stored in tables 244a and 244b, the controller 243 does not transfer and discards the data.

Furthermore, the controller 243 stores a threshold value for the amount of video data from the video data providing unit (A) 10a and the video data providing unit (B) 10b for transfer at once. The threshold value for the amount of data may be set according to the processing abilities of the providing-side VPN (A) 20a, the providing-side VPN (B) 20b, the transmitting-side VPN 50, the router 240, and the streaming server 260, the quality of video data transmission to the mobile terminal (A) 70a and the mobile terminal (B) 70b from the streaming server 260, and the number of mobile terminals (A) 70a and the mobile terminals (B) 70b, which connect to the streaming server 260 via a radio link and receive video data.

The controller 243 compares the threshold value with the amount of video data received by the router 240 via the information providing-side network, that is, the total amount of video data received by the router 240 via the providing-side VPN (A) 20a and video data received by the router 240 via the providing-side VPN (B) 20b. When request data of a new video data providing unit (A) 10a or video data providing unit (B) 10b, which is not currently providing video data, is received from the streaming server 260, the controller 243 then transfers the request data, if the total amount of video data received by the router 240 via the providing-side VPN (A) 20a and video data received by the router 240 via the providing-side VPN (B) 20b is less than the threshold value.

Meanwhile, when the request data of a new video data providing unit (A) 10a or a new video data providing unit (B) 10b, which is not currently providing video data, is received from the streaming server 260, the controller 243 does not transfer the request data, if the total amount of video data received by the router 240 via the providing-side VPN (A) 20a and video data received by the router 240 via the providing-side VPN (B) 20b is more than or equal to the threshold value. Otherwise, the controller 243 is substantially the same as the controller 43 shown in FIG. 3.

According to the communication system 201 and router 240, almost the same effects as those according to the communication system 1 and the router 40 shown in FIG. 2 can be obtained. In addition, the communication system 201 comprises a plurality of information providing-side networks including the providing-side VPN (A) 20a and the providing-side (B) 20b. The video data providing unit (A) 10a and the video data providing unit (B) 10b connect to the plurality of information providing-side networks, that is, the providing-side VPN (A) 20a and the providing-side (B) 20b, respectively. The router 240 connects between the transmitting-side VPN 50 and the providing-side VPN (A) 20a, and between the transmitting-side VPN 50 and the providing-side VPN (B) 20b, respectively.

Therefore, the communication system 201 can connect the transmitting-side VPN 50 to a plurality of information providing-side networks, that is, the providing-side VPN (A) 20a and the providing-side VPN (B) 20b via the router 240. Accordingly, even if there are many groups that need to ensure the security between the streaming server 260 and the information providing units, including a group between the streaming server 260 and the video data providing units (A) 10a, and a group between the streaming server 260 and the video data providing units (B) 10b, it is unnecessary to provide as many transmitting-side VPNs 50 as the number of groups that need to ensure security, so long as there are provided as many information providing-side networks, such as the providing-side VPN (A) 20a or the providing-side VPN (B) 20b, as the number of groups that need to ensure security.

For example, as shown in FIG. 8, the transmitting-side VPN 50, the router 240, and the streaming-server 260 can sufficiently function as they are, and it is unnecessary to provide a plurality of transmitting-side VPNs, a plurality of routers, and a plurality of streaming servers. It is also unnecessary to provide as many networks connecting both the information providing unit and the streaming server 260 as the number of groups that need to ensure security. Accordingly, the communication system 201, in which the information providing-side providing video data and the information transmitting-side can keep their own unique security policies,, can be constructed at low cost.

THIRD EMBODIMENT

Figure 10:
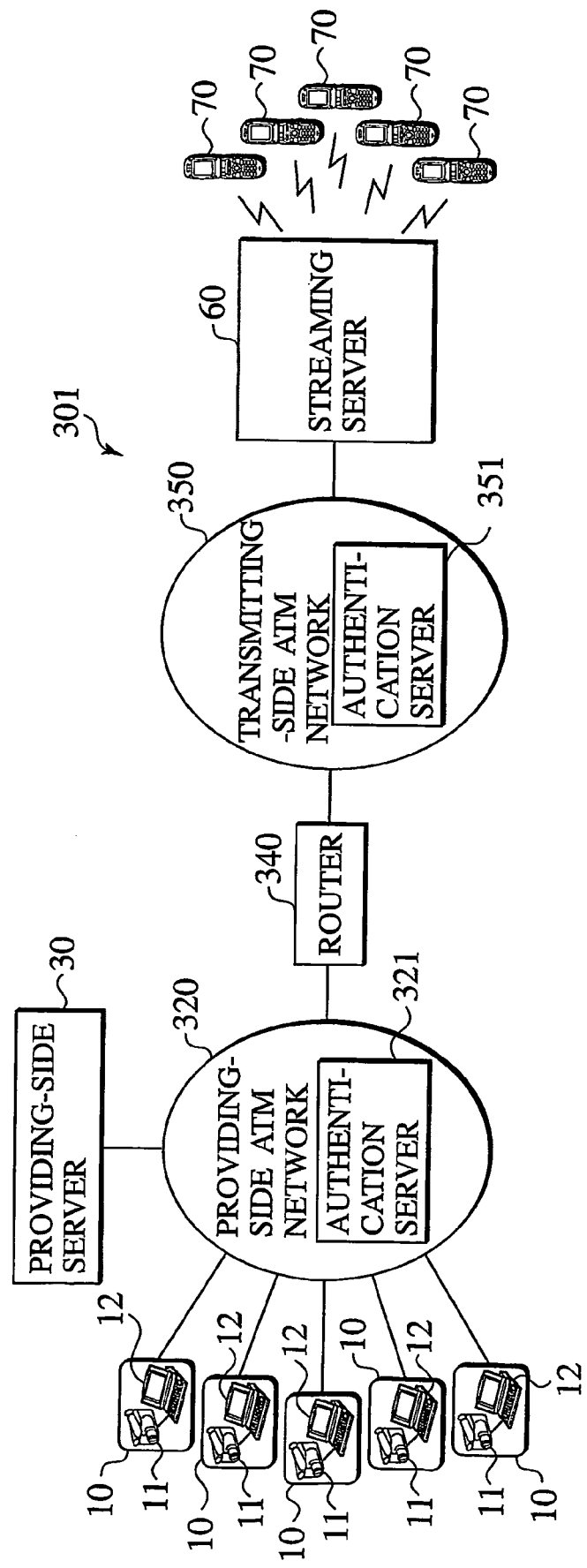
FIG. 10 is a diagram illustrating a configuration of a communication system according to a third embodiment of the present invention.

As shown in FIG. 10, a communication system 301 comprises a plurality of video data providing units 10, a providing-side asynchronous transfer mode (ATM) network 320, a providing-side server 30, a router 340, a transmitting-side ATM network 350, a streaming server 60, and a plurality of mobile terminals 70. The video data providing units 10, the providing-side server 30, the streaming server 60, and the mobile terminals 70 are substantially the same as the video data providing units 10, the providing-side server 30, the streaming server 60, and the mobile terminals 70 shown in FIG. 2.

The providing-side ATM network 320 is an information providing-side network connecting the video data providing units 10 and being restricted access. The providing-side ATM network 320 connects to the router 340, and connects to the transmitting-side ATM network 350 via the router 340. The providing-side ATM network 320 comprises an authentication server 321. For the video data providing units 10, the providing-side server 30, and other terminals, which attempt to access the providing-side ATM network 320, the authentication server 321 restricts access by using user IDs, passwords, and caller IDs. The video data providing units 10, the providing-side ATM network 320, and the providing-side server 30 have the same security policy, and use the same address architecture the video data providing units 10, the providing-side ATM network 320, and the providing-side server 30, which have the same unique security policy and use the same unique address architecture, are constructed by an information provider.

The transmitting-side ATM network 350 is an information providing-side network connecting the streaming server 60 and being restricted access. The transmitting-side ATM network 350 connects to the router 340. The transmitting-side ATM network 350 connects to the providing-side ATM network 320 via the router 340. The transmitting-side ATM network 350 comprises an authentication server 351. For the streaming server 60 and other terminals, which attempt to access the transmitting-side ATM network 350, the authentication server 351 restricts access using authentication of user IDs, passwords, and caller IDs. The streaming server 60 and the transmitting-side ATM network 350 have the same security policy, and use the same address architecture. The transmitting-side ATM network 350 and the streaming server 60, which have a unified unique security policy and a unified unique address architecture, are constructed by an information provider.

Figure 11:
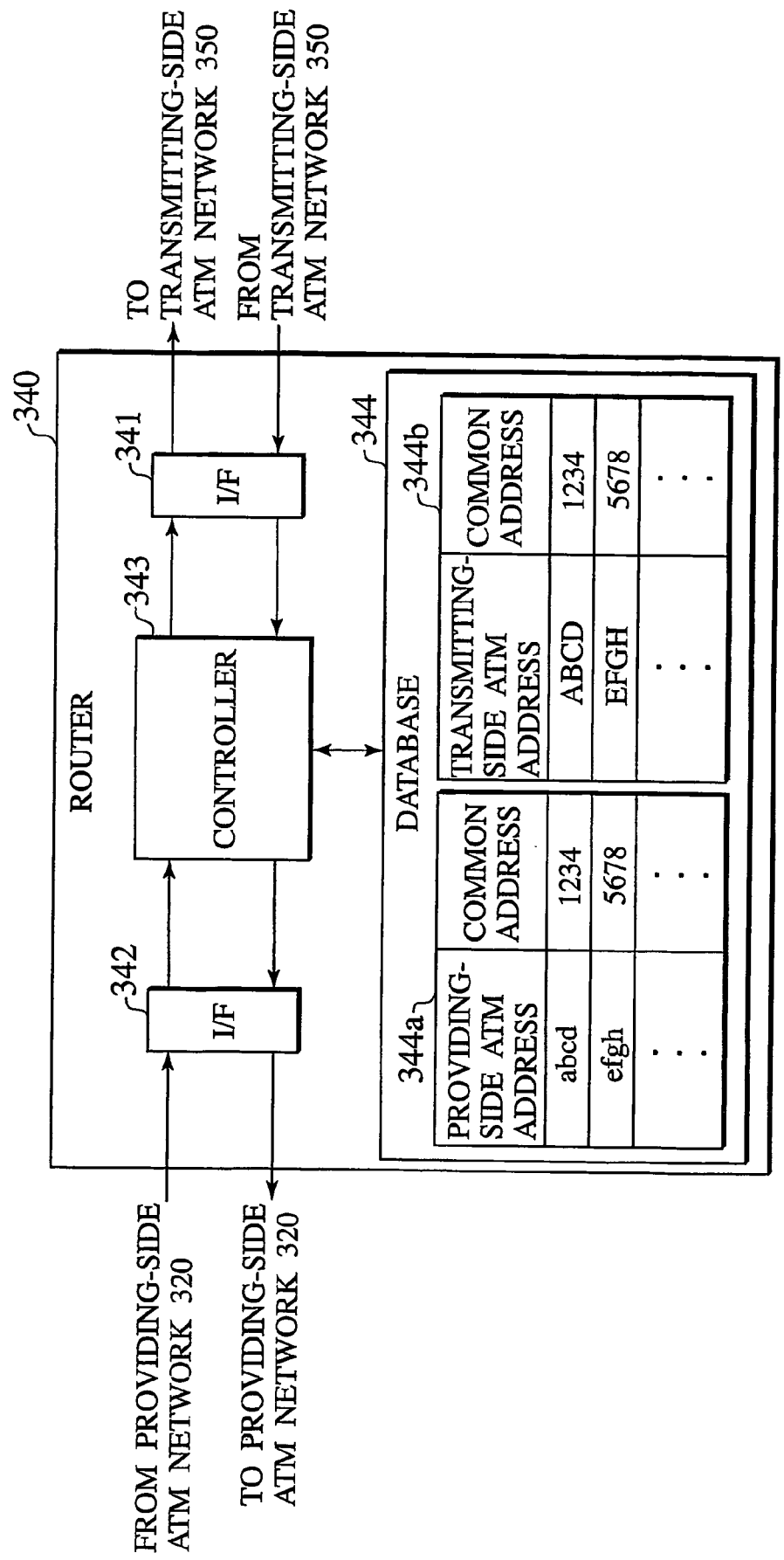
FIG. 11 is a block diagram illustrating a configuration of a router according to the third embodiment of the present invention.

As shown in FIG. 11, the router 340 comprises I/Fs 341 and 342, a controller 343, and a database 344. The I/F 341 connects to the transmitting-side ATM network 350. On the other hand, the I/F 342 connects to the providing-side ATM network 320. Thus, since the router 340 comprises the I/F 341 connecting to the transmitting-side ATM network 350 and the I/F 342 connecting to the providing-side ATM network 320, the router 340 may connect between the transmitting-side ATM network 350 and the providing-side ATM network 320. Otherwise, the I/Fs 341 and 342 are substantially the same as the I/Fs 41 and 42 shown in FIG. 3. Note that the router 340 has function of routing.

The controller 343 determines whether or not the transmitting-side data received via the transmitting-side ATM network 350 is data that has been transmitted from the streaming server 60, and whether or not the providing-side data received via the providing-side ATM network 320 is data that has been transmitted from the video data providing unit 10, and controls transfer of the transmitting-side data and the providing-side data based on those determination results. In this case, the router 340 once converts the address attached to data that has been transmitted to the video data providing unit 10 from the streaming server 60, or the address attached to data that has been transmitted to the streaming server 60 from the video data providing unit 10, into an address (hereafter, referred to as a common address), other than an address suitable for the providing-side ATM network 320 (hereafter, referred to as a providing-side ATM address) and an address suitable for the transmitting-side ATM network 350 (hereafter, referred to as a transmitting-side ATM address), respectively. The controller 243 then converts the converted common addresses into a transmitting-side ATM address or a providing-side ATM address, respectively, and transfer data.

The database 344 comprises tables 344a and 344b. Tables 344a and 344b store addresses given to each of the video data providing units 10 and the streaming server 60. Furthermore, table 344a stores the common addresses corresponding to the providing-side ATM addresses, which are given to each of the video data providing units 10 and the streaming server 60. In addition, table 344b stores the common addresses corresponding to the transmitting-side ATM addresses, which are given to the streaming server 60 and each of the video data providing units 10.

FIG. 11 illustrates table 344a, which the providing-side ATM address "abcd" is given to the video data providing unit 10 and corresponding common address is "1234", and the common address of the streaming server 60 is "5678" and corresponding providing-side ATM address is "efgh". In addition, FIG. 11 illustrates table 344b, which a transmitting-side ATM address "EFGH" is given to the streaming server 60 and corresponding common address is "5678", and a common address of the video data providing unit 10 is "1234" and corresponding transmitting-side ATM address is "ABCD".

When the controller 343 receives a packet including request data or instruction data, which the router 340 has received as the transmitting-side data, from the I/F 341, it then accesses table 344b and determines whether or not the source address attached to the request data or instruction data matches the transmitting-side ATM address of the streaming server 60 stored in the table 344b. In the case of FIG. 11, when the source address matches the transmitting-side ATM address of the streaming server 60 "efgh" stored in table 344b, the controller 343 determines that the transmitting-side data, such as request data or instruction data, is data that has been transmitted from the streaming server 60.

The controller 343 then accesses table 344b and obtains the common addresses corresponding to the source address "EFGH" and the destination address "ABCD" indicated by the transmitting-side ATM addresses. The controller 343 once converts the source address "EFGH" indicated by the transmitting-side ATM address into the obtained common address "5678", and the destination address "ABCD" indicated by the transmitting-side ATM address into the obtained common address "1234". The controller 343 then accesses table 344a and obtains providing-side ATM addresses corresponding to the source address "5678" and the destination address "1234", which are indicated by the common addresses. The controller 343 converts the source address "5678" indicated by the common address into the obtained providing-side ATM address "efgh", and converts the destination address "1234" indicated by the common address into the obtained providing-side ATM address "abcd". Finally, the controller 343 inputs a packet including request data or instruction data, which has the converted source address and the converted destination address to the I/F 342, and transfers the packet to the video data providing unit 10 via the providing-side ATM network 320.

Similarly, when the controller 344a receives a packet including video data, which the router 340 has received as the providing-side data, from the I/F 342, it then accesses the table 344a and determines whether or not the source address attached to the video data is one of addresses of the video data providing units 10, which are indicated by the providing-side ATM addresses and stored in table 344a. In the case of FIG. 11, when the source address matches the address of the video data providing unit 10 "abcd" stored in table 344a, the controller 343 determines that the video data being the providing-side data is data that has been transmitted from the video data providing unit 10.

The controller 343 then accesses the table 344a and obtains the common addresses corresponding to the source address "abcd" and the destination address "efgh", which are indicated by the providing-side ATM addresses. The controller 343 once converts the source address "abcd" indicated by the providing-side ATM address into the obtained common address "1234", and the destination address "efgh" indicated by the providing-side ATM address into the obtained common address "5678".

The controller 343 then accesses the table 344b and obtains transmitting-side ATM addresses corresponding to the source address "1234" and the destination address "5678", which are indicated by the common addresses. The controller 343 converts the source address "1234" indicated by the common address into the obtained transmitting-side ATM address "ABCD", and the destination address "5678" indicated by the common address into the obtained transmitting-side ATM address "EFGH". Finally, the controller 343 inputs a packet including video data, which is attached the converted source address and the converted destination address to the I/F 341, and transfers the packet to the streaming server 60 via the transmitting-side ATM 350.

Note that when the source address attached to the transmitting-side data that has been received by the router 340, does not match the transmitting-side ATM address of the streaming server 60 stored in table 344*b*, the controller 343 does not transfer and discards the data. Similarly, when the source address attached to the providing-side data that has been received by the router 340, does not match the providing-side ATM addresses of the video data providing units 10 stored in table 344*a*, the controller 343 does not transfer and discards that data.

Furthermore, the controller 343 stores a threshold value for the amount of video data from the video data providing unit 10 and for transfer at once, as with the controller 43 shown in FIG. 3. The controller 343 then compares the threshold value with the amount of video data received by the router 340 via the providing-side ATM network 320, and controls transfer of the transmitting-side data and the providing-side data based on the comparison result, in the same manner as the controller 43 shown in FIG. 3. Otherwise, the controller 343 is substantially the same as the controller 43 shown in FIG. 3.

According to the communication system 301 and router 340, almost the same effects as those according to the communication system 1 and the router 40 shown in FIG. 2 can be obtained. More specifically, the router 340 converts the transmitting-side ATM address attached to request data or instruction data transmitted to the video data providing unit 10 from the streaming server 60, into a common address, and converts the converted common address into the providing-side ATM address. The router 340 also converts the providing-side ATM address attached to video data transmitted to the streaming server 60 from the video data providing unit 10, into the common address, and converts the converted common address into the transmitting-side ATM address. Accordingly, a group of the video data providing unit 10 and the providing-side ATM network 220, and a group of the streaming server 60 and the transmitting-side ATM network 350, may connect via the router 340 while maintaining their own unique address architecture, respectively. As a result, since it is unnecessary for the communication system 301 to use the same address architecture, the communication system 301 can be constructed at low cost.

MODIFIED EXAMPLE

The present invention is not limited to the above-mentioned embodiments, and various modifications are possible. In the above-mentioned embodiments, the video data providing units 10, the video data providing units (A) 10*a*, and the video data providing units (B) 10*b*, which are information providing unit, provide video data as information data; however, information data provided from the information providing unit is not limited to video data. The information providing unit may provide, for example, sound data, text data, and still image data as the information data.

In addition, when controlling transfer of data based on the comparison results between the threshold value and the amount of video data received by the router 40 via the providing-side VPN 20, the controller 43 may transfer request data from the streaming server 60 to the video data providing unit 10, and limit the transfer of video data obtained from the video data providing unit 10. More specifically, when the amount of video data received by the router 40 via the providing-side VPN 20 is less than the threshold value, the controller 43 transfers the video data obtained from the video data providing unit 10 to the streaming server 60. Meanwhile, when the amount of video data received by the router 40 via the providing-side VPN 20 is more than or equal to the threshold value, the controller 43 does not transfer the video data obtained from that video data providing unit 10, in response to the request data from the streaming server 60 for a new video data providing unit 10 that is not currently providing video data. Furthermore, the controller 43 notifies the video data providing unit 10 that video data transfer has been rejected.

In this case, since video data in relation to the request data or instruction data cannot be received after a specified period has elapsed, the streaming server 60 transmits the request data or instruction data again. When video data in relation to the re-transmitted request data or instruction data is not transmitted after another specified period has elapsed, the streaming server 60 determines that the network is currently congested, and thereby video data cannot be provided. The streaming server 60 then notifies the mobile terminal 70 that video data cannot be provided due to current network congestion.

In the communication systems 1, 201, and 301, shown in FIGS. 2, 8, and 10, respectively, a plurality of groups of the transmitting-side VPNs 50 and the streaming servers 60 or 260, or a plurality of groups of the transmitting-side ATM networks 350 and the streaming servers 60 may be provided, and in this case, the routers 40, 240, and 340 may be provided for each of a plurality of transmitting-side VPNs 50 or transmitting-side ATM networks-350. When there is a single streaming server 6 or 260 as with the case of the communication systems 1, 201, and 301, a plurality of routers 40, 240, and 340 may be provided. In the communication system 201 shown in FIG. 8, the router 240 may be provided for each of a plurality of providing-side VPNs (A) 20*a* or providing-side VPNs (B) 20*b*. In addition, the communication system 301 shown in FIG. 10 may also include a plurality of providing-side ATM networks 320, which are providing-side networks, as with the communication system 201 shown in FIG. 8.

Furthermore, in the communication system 201 shown in FIG. 8, the providing-side VPN (A) 20*a* and the providing-side VPN (B) 20*b* may connect to a single network, and the providing-side VPN (A) 20*a* and the providing-side VPN (B) 30*b* may connect to the router 240 via that network. For example, when there is an existing network in collective housing or a building with multiple tenants, a plurality of providing-side networks may connect to the existing network, and a plurality of providing-side networks may connect to the router via the existing network. Accordingly, for example, when the transfer speed of the network connecting each of the providing-side networks is faster than the transfer speed of each providing-side network, each information providing unit may efficiently transmit information data with large capacity such as video data, compared to the case of transmission via the providing-side network. Note that in FIG. 10, an ATM exchanger having the function of router 340 may be provided at least one of within the both of providing-side ATM network 320 and the transmitting-side ATM network 350, providing-side ATM network 320, or the transmitting-side ATM network 350.

INDUSTRIAL APPLICABILITY

As described above, the present invention can provide a communication system, which has high security and can be constructed at low cost, where an information providing-side providing information data and an information transmitting-side transmitting the information data obtained from the information providing-side to a terminal can maintain their own unique security policy, and a transfer device used for the communication system.

The invention claimed is:

1. A communication system comprising:
an information providing unit configured to provide information data;
an information providing-side network configured to provide connectivity to the information providing unit, to restrict access to the information providing-side network, and to operate under a first security policy restricting access to the information providing-side network based on an authentication determination made from within the information providing-side network;
an information transmitter configured to obtain the information data by transmitting request data for requesting the information data to the information providing unit, and transmit obtained information data to a terminal;
an information transmitting-side network configured to provide connectivity to the information transmitter, to restrict access to the information transmitting-side network, and to operate under a second security policy restricting access to the information transmitting-side network based on an authentication determination made from within the information transmitting-side network; and
a transfer unit comprising an interface for each of the information transmitting-side network and the information providing-side network, the transfer unit configured to connect to each of the networks, determine whether or not transmitting-side data received via the information transmitting-side network is data transmitted from the information transmitter, and whether or not providing-side data received via the information providing-side network is data transmitted from the information providing unit, and transfer the transmitting-side data and the providing-side data based on determination results.

2. The communication system of claim 1, further comprising:
a plurality of information providing-side networks, wherein
the transfer unit connects the information transmitting-side network and the plurality of information providing-side networks.

3. The communication system of claim 1, wherein the transfer unit converts an address attached to data transmitted to the information providing unit from the information transmitter, into a providing-side address, and converts an address attached to data transmitted to the information transmitter from the information providing unit, into a transmitting-side address.

4. The communication system of claim 1, wherein the transfer unit converts an address attached to data transmitted to the information providing unit from the information transmitter, into a common address, converts a converted common address into a providing-side address, converts an address attached to data transmitted to the information transmitter from the information providing unit, into the common address, and converts a converted common address into a transmitting-side address.

5. The communication system of claim 1, wherein the transfer unit memorizes a threshold value for an amount of the information data from the information providing unit for transfer at once, compares the threshold value with an amount of the information data received from the information providing unit via the information providing-side network, and controls transfer of the transmitting-side data and the providing-side data based on a comparison result.

6. The communication system of claim 1, wherein the information data is video data.

7. The communication system of claim 1, wherein at least one of the information providing-side network and the information transmitting-side network is a virtual private network.

8. A transfer device comprising:
a first interface connected to an information providing-side network, wherein the information providing-side network is configured to provide connectivity to an information providing unit, to restrict access to the information providing-side network, and to operate under a first security policy restricting access to the information providing-side network based on an authentication determination made from within the information providing-side network;
a second interface connected to an information transmitting-side network, wherein the information transmitting-side network is configured to provide connectivity to an information transmitter, to restrict access to the information transmitting-side network, and to operate under a second security policy restricting access to the information transmitting-side network based on an authentication determination made from within the information transmitting-side network, and the information transmitter obtains the information data by transmitting request data for requesting the information data to the information providing unit and transmitting obtained information data to a terminal; and
a controller configured to determine whether or not transmitting-side data received via the information transmitting-side network is data transmitted from the information transmitter, determine whether or not providing-side data received via the information providing-side network is data transmitted from the information providing unit, and transfer the transmitting-side data and the providing-side data based on determination results.

9. The communication system of claim 2, the transfer unit further comprising an interface for each of the plurality of information providing-side networks.

* * * * *